United States Patent [19]

Kayaki

[11] Patent Number: 5,067,210
[45] Date of Patent: Nov. 26, 1991

[54] SURFACE-TYPE FASTENER

[75] Inventor: Keiichi Keyaki, Kurobe, Japan

[73] Assignee: Yoshida Kogyo K. K., Tokyo, Japan

[21] Appl. No.: 592,126

[22] Filed: Oct. 3, 1990

[30] Foreign Application Priority Data

Oct. 3, 1989 [JP] Japan ................. 1-116535

[51] Int. Cl.⁵ .............................................. A44B 13/00
[52] U.S. Cl. ......................................... 24/452; 24/442
[58] Field of Search ............... 24/443, 449, 442, 452, 24/445, 447, 575

[56] References Cited

U.S. PATENT DOCUMENTS

| 3,266,113 | 8/1966 | Flanagan | 24/452 |
| 3,808,648 | 5/1974 | Billarant et al. | 24/442 |
| 4,709,453 | 12/1987 | Harvey et al. | 24/442 |
| 4,894,060 | 1/1990 | Nestegard | 24/442 |

FOREIGN PATENT DOCUMENTS

| 0324577 | 7/1989 | European Pat. Off. |
| 901041 | 1/1954 | Fed. Rep. of Germany. |
| WO89/08201 | 9/1989 | France. |
| 2027794 | 2/1980 | United Kingdom ............... 24/447 |

Primary Examiner—Laurie K. Crammer
Attorney, Agent, or Firm—Hill, Van Santen, Steadman & Simpson

[57] ABSTRACT

A surface-type fastener comprises a pair of identical strips and a pluarity of rows of interengaging elements distributed over the strips in offset positional relation to one another to provide engaging spaces. The elements has a relatively large but their engaging arms which are interengageable in the engaging spaces with their neighboring counterparts on the opposite strip.

5 Claims, 2 Drawing Sheets

SURFACE-TYPE FASTENER

BACKGROUND OF THE INVENTION

1. Field of the Invention

This invention relates to a surface-type fastener having a multiplicity of interengaging elements formed from a thermoplastic resinous material.

2. Prior Art

A prior art surface-type fastener, in and relating to which the present invention provides improvements, is disclosed in Japanese Utility Model Publication 44-27202 wherein the fastener comprises a pair of interengaging planar base strips each carrying a multiplicity of spaced interengaging or mating elements with bulged head portions which are engageable through the intermediary of gaps or spaces between adjacent elements. These interengaging elements are formed from a plastics material and hence are elastically deformable. However, they are not elastic enough to permit coupling of the paired fastener strips in any desired posture, and it is often necessary to bend one strip over arcuately thereby enlarging the element-to-element gaps to facilitate the insertion therein or the removal therefrom of the interengaging elements on the other strip. Such a surface-type fastener may be used satisfactorily on relatively flexible articles such as clothing, sleeping bags and the like, but are not suitable for use with relatively rigid articles such as decorative panels, furnitures and the like. Furthermore, the interengaging elements being bulged at their head portions are difficult to form by and to separate from the injection molds.

SUMMARY OF THE INVENTION

It is therefore a primary object of the present invention to eliminate or alleviate the foregoing drawbacks of the prior art by providing a surface-type fastener which is capable of opening and closing with its pair of base strips held in parallel superimposed relation to each other and which is easily formed by injection molding of a plastics material.

According to the invention, there is provided a surface-type fastener comprising a pair of base strips and a plurality of rows of interengaging elements, each of the base strips having longitudinal ridges and transverse ribs defining therebetween elongate apertures, the interengaging elements each having a stem portion extending substantially vertically upward from the base strip, and a relatively thin hook-shaped engaging arm which is substantially as large as the aperture, and the interengaging elements in one row being offset in position with respect to those elements in the next adjoining row to provide an engaging space in which the arms are resiliently engaged with one another.

The above and other objects and features of the invention will appear clear from the following detailed description taken in connection with the accompanying drawings which illustrate by way of example a preferred embodiment.

DETAILED DESCRIPTION OF THE INVENTION

Figure 1:
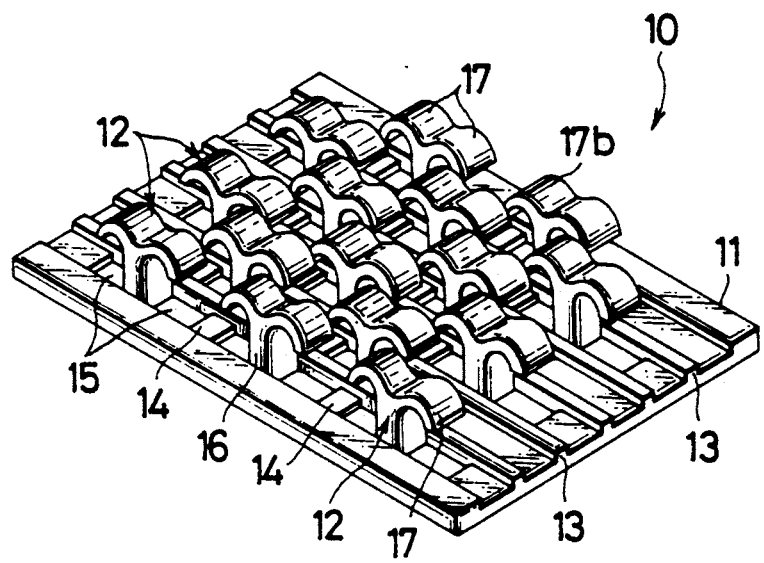
FIG. 1 is a perspective view of a surface-type fastener representing an identical half of a pair of mating fasteners provided in accordance with the invention.

Referring now to the drawings and FIG. 1 in particular, there is shown one of a pair of identical halves constituting a surface-type fastener 10 constructed in accordance with the invention, it being understood that the identical halves are engageable face to face with each other through the intermediary of interengaging elements formed on and projecting from one surface of each half of the fastener 10.

The surface-type fastener 10 comprises a pair of base strips 11, 11' shown illustratively in the form of a rectangular web and a multiplicity of interengaging elements 12 integral with and projecting from one surface of each of the base strips 11, 11'. These parts of the fastener 10 are formed from a thermoplastic material such as polyvinyl chloride, polyamide, polyethylene and the like by means of for example injection molding.

The base strip 11 has a plurality of longitudinal ridges 13 and a plurality of transverse ribs 14 interconnecting the ridges 13 transversely across the base strip 11. The ridges 13 and the ribs 14 each jointly define therebetween an elongate aperture 15 receiving centrally therein each of the interengaging elements 12 aligned in a longitudinal row.

The interengaging elements 12 each have a vertical stem portion 16 extending substantially vertically upward from the base strip 11 and a pair of relatively thin hook-shaped engaging arm portions 17 bifurcating from a top end of the stem portion 16 in opposite directions longitudinally of the base strip 11.

The distribution of the interengaging elements 12 over the base strip 11 is such that the elements 12 are aligned transversely in every other rows and offset in position longitudinally with respect those in adjacent or neighboring rows. This arrangement provides engaging spaces 18 in one base strip 11 for receiving the interengaging elements 12 on the other mating base strip 11'.

Figure 2:
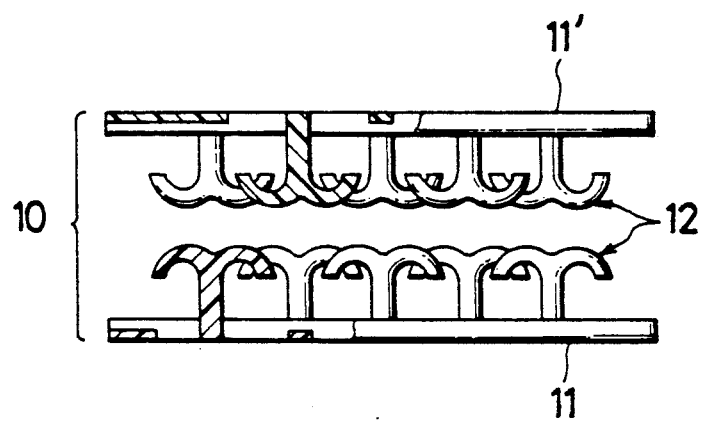
FIG. 2 is a longitudinal cross-sectional view of a pair of surface-type fasteners of the invention shown in separated, confronting relation.

The length L of one of the two bifurcated arm portions 17 is substantially equal, preferably slightly smaller than the distance D between the side line 16a of the stem 16 and the next adjoining row of elements 12 as shown in FIG. 2. Additionally, as shown in FIG. 4, each one of the two engaging arm portions 17 has its peripheral tip edge 17a disposed slightly apart from the side line 14b of the adjacent rib 14, thereby facilitating the formation by injection molding of the interengaging elements 12.

Figure 4:
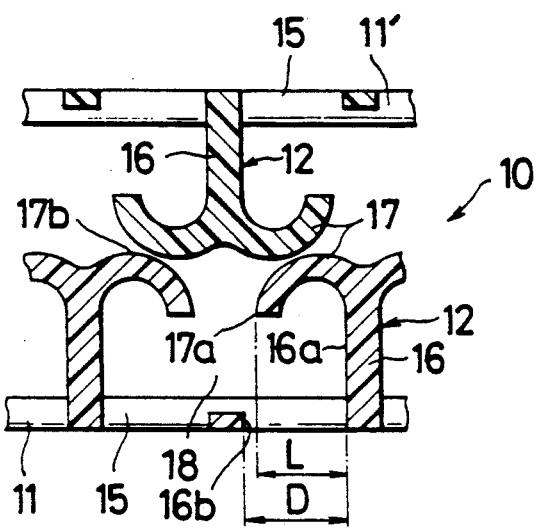
FIG. 4 is a longitudinal cross-sectional view on enlarged scale of a portion of each of the paired surface-type fasteners.
Figure 5:
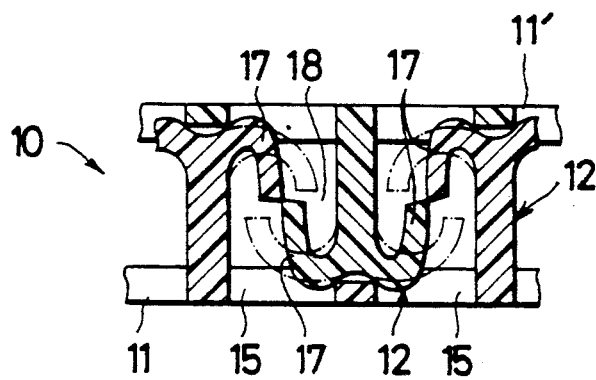
FIG. 5 is a view similar to FIG. 4 but showing the paired fasteners in coupled condition.

As better shown in FIGS. 2 and 4, the bifurcated arms 17 each are arcuately shaped to provide a rounded outer peripheral surface 17b which is smoothly engageable with and easily deformable mutually with a counterpart 17b on the opposite mating base strip 11', so as to facilitate coupling and uncoupling of a pair of strips 11, 11' as illustrated in FIG. 5.

Figure 3:
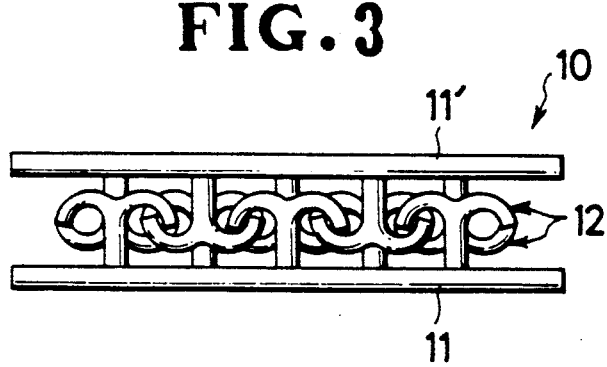
FIG. 3 is a front elevational view of the same shown coupled together.

With this construction, the surface-type fastener 10 according to the invention operates as follows. One or upper strip 11' is held in confronting relation face to face with the other or lower strips 11 as shown in FIG. 2, and both strips 11, 11' are then pressed against each other, when the engaging arms 17 of the interengaging elements 12 on the opposite strips 11, 11' are mutually elastically deformed or shrunk within the engaging spaces 18. This deformation is prompted by the provision of the apertures 15 into which the arms 17 of the elements 12 are allowed to partially move as shown in FIG. 5. Releasing the pressure on the upper strip 11' will enable the element arms 17 to spring back and clinch with one another on the opposite strips 11, 11' as shown in FIG. 3, in which position each longitudinal row of interengaging elements 12 assumes a chain-like profile which ensures firm engagement of the strips 11, 11' against relative displacement.

The geometric and structural features of the surface-type fastener 10 thus provide for smooth, effective engagement and disengagement of its identical halves or strips 11, 11' in a planar plane and therefore make it possible to apply the fastener 10 on a relatively rigid article such as decorative panels, furnitures and the like.

Having thus described the invention, various changes and modifications may be made in the form and construction herein advanced as appear apparent to those skilled in the art, without departing from the scope of the appended claims.

For example, the interengaging element 12 may be configured such that a single hook-like engaging arm may be formed instead of two bifurcated arms 17, in which instance such single arm on one strip 11 is oriented in one direction while that on the other strip 11' is oriented in the opposite direction thereby providing effective coupling engagement of the elements 12.

What is claimed is:

1. A surface-type fastener comprising a pair of base strips each having longitudinal ridges and transverse ribs defining therebetween elongate apertures and a plurality of rows of interengaging elements, said apertures extending through said base strips, said interengaging elements each having a stem portion extending substantially vertically upward from said longitudinal ridges, and a hookable engaging arm which is substantially as large as said aperture, and said interengaging elements in one row being offset in position with respect to those elements in the next adjoining row, and spaced-apart longitudinally to provide an engaging space in which said arms of said base strips can be resiliently engaged with one another when said base strips are pressed together.

2. A surface-type fastener according to claim 1 wherein said engaging arm comprises a pair of hook shaped engaging arm portions bifurcating from said stem portion in opposite directions.

3. A surface-type fastener according to claim 1 or claim 2, wherein said interengaging elements are arranged having a spacing such that when said base strips are pressed together a plurality of interengaging elements each are engaged to respective adjacent elements of said opposite base strip on both longitudinal sides of each of said elements along said row in a continuous chain-like fashion.

4. A surface-type fastener according to claim 2, wherein said hook-shaped engaging arm portions have rounded outer peripheral surfaces.

5. A surface-type fastener according to claim 1 wherein said arm is slightly smaller than said aperture.

* * * * *